US012463709B2

(12) United States Patent
Liu et al.

(10) Patent No.: US 12,463,709 B2
(45) Date of Patent: Nov. 4, 2025

(54) BEAM SWEEP AND BEAM INDICATION ON PHYSICAL SIDELINK CHANNELS

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Yisheng Xue, San Diego, CA (US); Ozcan Ozturk, San Diego, CA (US); Tao Luo, San Diego, CA (US); Sony Akkarakaran, Poway, CA (US); Juan Montojo, San Diego, CA (US); Peter Gaal, San Diego, CA (US); Rajat Prakash, San Diego, CA (US); Changlong Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 18/001,408

(22) PCT Filed: Jul. 31, 2020

(86) PCT No.: PCT/CN2020/106083
§ 371 (c)(1),
(2) Date: Dec. 9, 2022

(87) PCT Pub. No.: WO2022/021276
PCT Pub. Date: Feb. 3, 2022

(65) Prior Publication Data
US 2023/0231616 A1    Jul. 20, 2023

(51) Int. Cl.
*H04B 7/08* (2006.01)
*H04B 7/06* (2006.01)
(Continued)

(52) U.S. Cl.
CPC ......... *H04B 7/088* (2013.01); *H04B 7/06954* (2023.05); *H04W 16/28* (2013.01); *H04W 72/25* (2023.01)

(58) Field of Classification Search
CPC ....... H04B 7/088; H04W 72/25; H04W 16/28
See application file for complete search history.

(56) References Cited

U.S. PATENT DOCUMENTS

| 12,207,303 B2 * | 1/2025 | Awadin ............... H04B 7/0695 |
| 2006/0203789 A1 * | 9/2006 | Iacono ................. H04B 7/0608 370/352 |

(Continued)

FOREIGN PATENT DOCUMENTS

| CN | 110798297 A | 2/2020 |
| CN | 111132329 A | 5/2020 |

(Continued)

OTHER PUBLICATIONS

International Search Report and Written Opinion—PCT/CN2020/106083—ISA/EPO—Apr. 7, 2021.

*Primary Examiner* — Derrick V Rose
(74) *Attorney, Agent, or Firm* — QUALCOMM Incorporated

(57) ABSTRACT

Various aspects of the present disclosure generally relate to wireless communication. In some aspects, a user equipment (UE) may transmit communications on a plurality of physical sidelink channels with a plurality of beams for a plurality of subchannels. The UE may select a beam for transmission or reception from among the plurality of beams. Numerous other aspects are provided.

21 Claims, 10 Drawing Sheets

(51) Int. Cl.
*H04W 16/28* (2009.01)
*H04W 72/25* (2023.01)

(56) References Cited

U.S. PATENT DOCUMENTS

| | | | | |
|---|---|---|---|---|
| 2020/0367204 | A1* | 11/2020 | Li | H04W 72/02 |
| 2020/0404624 | A1* | 12/2020 | Roth | H04L 5/0044 |
| 2022/0132516 | A1* | 4/2022 | Hwang | H04W 72/563 |
| 2022/0286184 | A1* | 9/2022 | Li | H04L 5/0051 |
| 2022/0287055 | A1* | 9/2022 | Lee | H04W 72/1263 |
| 2023/0189301 | A1* | 6/2023 | Zhao | H04L 5/0055 370/329 |
| 2023/0276462 | A1* | 8/2023 | Hwang | H04L 5/0055 370/329 |

FOREIGN PATENT DOCUMENTS

| | | |
|---|---|---|
| CN | 111344956 A | 6/2020 |
| WO | WO-2019128261 A1 | 7/2019 |
| WO | WO-2020033622 A1 | 2/2020 |

* cited by examiner

BEAM SWEEP AND BEAM INDICATION ON PHYSICAL SIDELINK CHANNELS

CROSS-REFERENCE TO RELATED APPLICATION

This Patent Application is a 371 national stage of PCT Application No. PCT/CN2020/106083 filed on Jul. 31, 2020, entitled "BEAM SWEEP AND BEAM INDICATION ON PHYSICAL SIDELINK CHANNELS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a beam sweep and a beam indication on physical sidelink channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Aspects of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting communications on a plurality of physical sidelink channels with a plurality of beams for a plurality of subchannels, and selecting a beam for transmission or reception from among the plurality of beams.

In some aspects, a method of wireless communication performed by UE includes receiving, from another UE, at least one communication on at least one physical sidelink channel on at least one beam, determining feedback for the at least one beam, and transmitting the feedback to the other UE on a PSFCH.

In some aspects, a UE for wireless communication includes a memory and one or more processors operatively coupled to the memory, the memory and the one or more processors configured to transmit communications on a plurality of physical sidelink channels with a plurality of beams for a plurality of subchannels, and select a beam for transmission or reception from among the plurality of beams.

In some aspects, a UE for wireless communication includes a memory and one or more processors operatively coupled to the memory, the memory and the one or more processors configured to receive, from another UE, at least one communication on at least one physical sidelink channel on at least one beam, determine feedback for the at least one beam, and transmit the feedback to the other UE on a PSFCH.

In some aspects, a non-transitory computer-readable medium storing a set of instructions for wireless communication includes one or more instructions that, when executed by one or more processors of a UE, cause the UE to transmit communications on a plurality of physical sidelink channels with a plurality of beams for a plurality of subchannels, and select a beam for transmission or reception from among the plurality of beams.

In some aspects, a non-transitory computer-readable medium storing a set of instructions for wireless communication includes one or more instructions that, when executed by one or more processors of an UE, cause the UE to receive, from another UE, at least one communication on at least one physical sidelink channel on at least one beam, determine feedback for the at least one beam, and transmit the feedback to the other UE on a PSFCH.

In some aspects, an apparatus for wireless communication includes means for transmitting communications on a plurality of physical sidelink channels with a plurality of beams for a plurality of subchannels, and means for selecting a beam for transmission or reception from among the plurality of beams.

In some aspects, an apparatus for wireless communication includes means for receiving, from another apparatus, at least one communication on at least one physical sidelink channel on at least one beam, means for determining feedback for the at least one beam, and means for transmitting the feedback to the other apparatus on a PSFCH.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of aspects according to the disclosure in order that the detailed description that follows may be better understood. Additional features and advantages will be described hereinafter. The conception and specific aspects disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. On some aspects, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
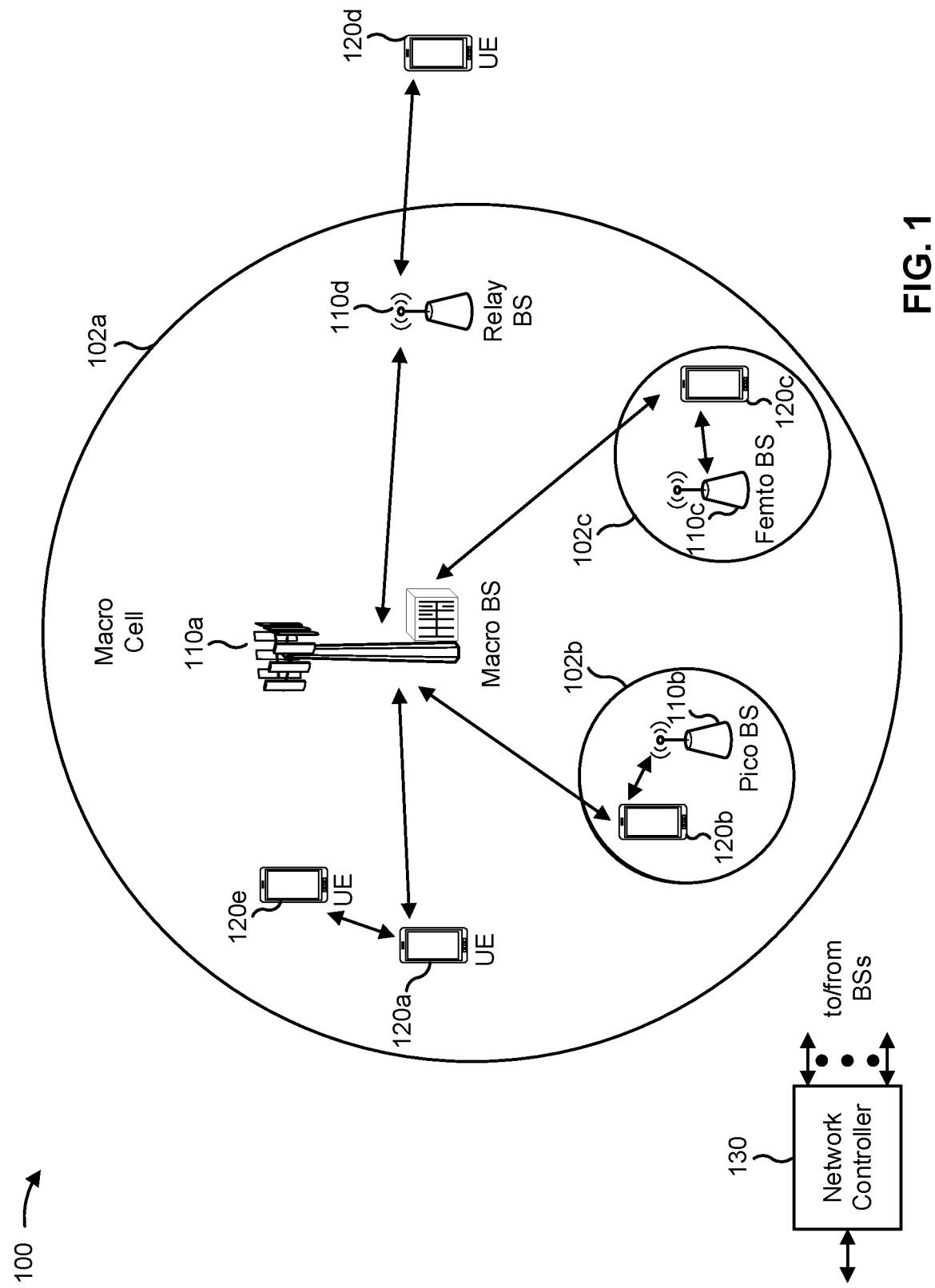
FIG. 1 is a diagram illustrating an aspect of a wireless network, in accordance with various aspects of the present disclosure.

FIG. 1 is a diagram illustrating a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. ABS for a femto cell may be referred to as a femto BS or a home BS. As shown in FIG. 1, a BS 110a may be a macro BS for a macro cell 102a, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. As shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. In some aspects, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, in some aspects, robots, drones, remote devices, sensors, meters, monitors, location tags, and/or the like, that may communicate with a base station, another device (e.g., remote device), or some other entity. A wireless node may provide, in some aspects, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. In some aspects, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). In some aspects, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. In some aspects, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an aspect. Other aspects may differ from what is described with regard to FIG. 1.

Figure 2:
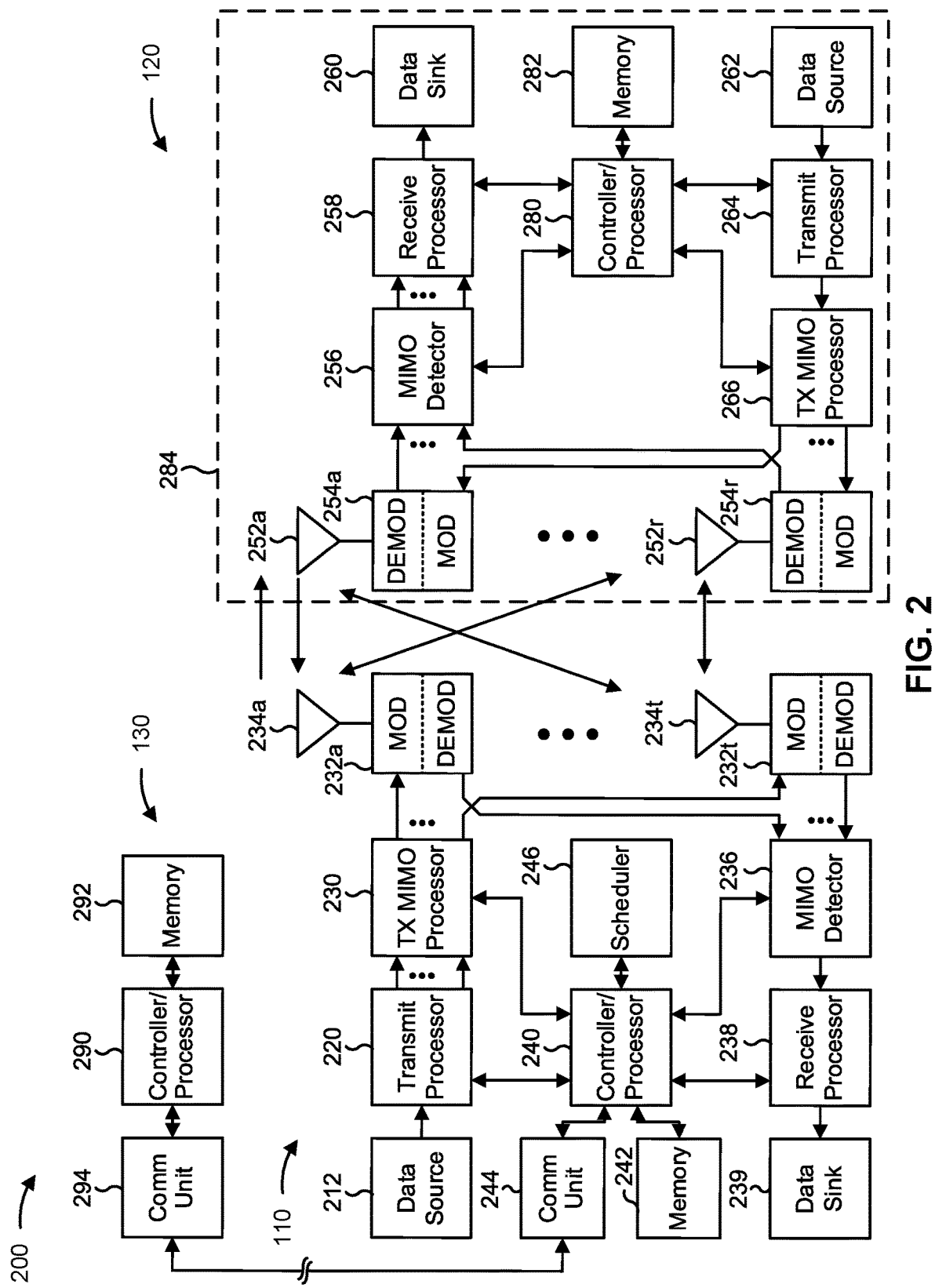
FIG. 2 is a diagram illustrating an aspect of a base station in communication with a user equipment (UE) in a wireless network, in accordance with various aspects of the present disclosure.

FIG. 2 is a diagram illustrating an aspect 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, in some aspects, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, in some aspects, as described with reference to FIGS. 5-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, in some aspects, as described with reference to FIGS. 5-10.

Controller/processor 240 of base station 110, controller/processor 280 of UE 120, and/or any other component(s) of FIG. 2 may perform one or more techniques associated with a beam sweep and a beam indication on physical sidelink channels, as described in more detail elsewhere herein. In some aspects, controller/processor 240 of base station 110, controller/processor 280 of UE 120, and/or any other component(s) of FIG. 2 may perform or direct operations of, in some aspects, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. In some aspects, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, in some aspects, process 900 of FIG. 9, process 1000 of FIG. 10, and/or other processes as described herein. In some aspects, executing instructions may include running the instructions, converting the instructions, compiling the instructions, interpreting the instructions, and/or the like.

In some aspects, UE 120 may include means for transmitting communications on a plurality of physical sidelink channels with a plurality of beams for a plurality of subchannels, means for selecting a beam for transmission or reception from among the plurality of beams, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving, from another UE, at least one communication on at least one physical sidelink channel on at least one beam, means for determining feedback for the at least one beam, means for transmitting the feedback to the other UE on a PSFCH, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. In some aspects, the functions described with respect to the transmit processor 264, the receive processor 258, and/or the TX MIMO processor 266 may be performed by or under the control of controller/processor 280.

As indicated above, FIG. 2 is provided as an aspect. Other aspects may differ from what is described with regard to FIG. 2.

Figure 3:
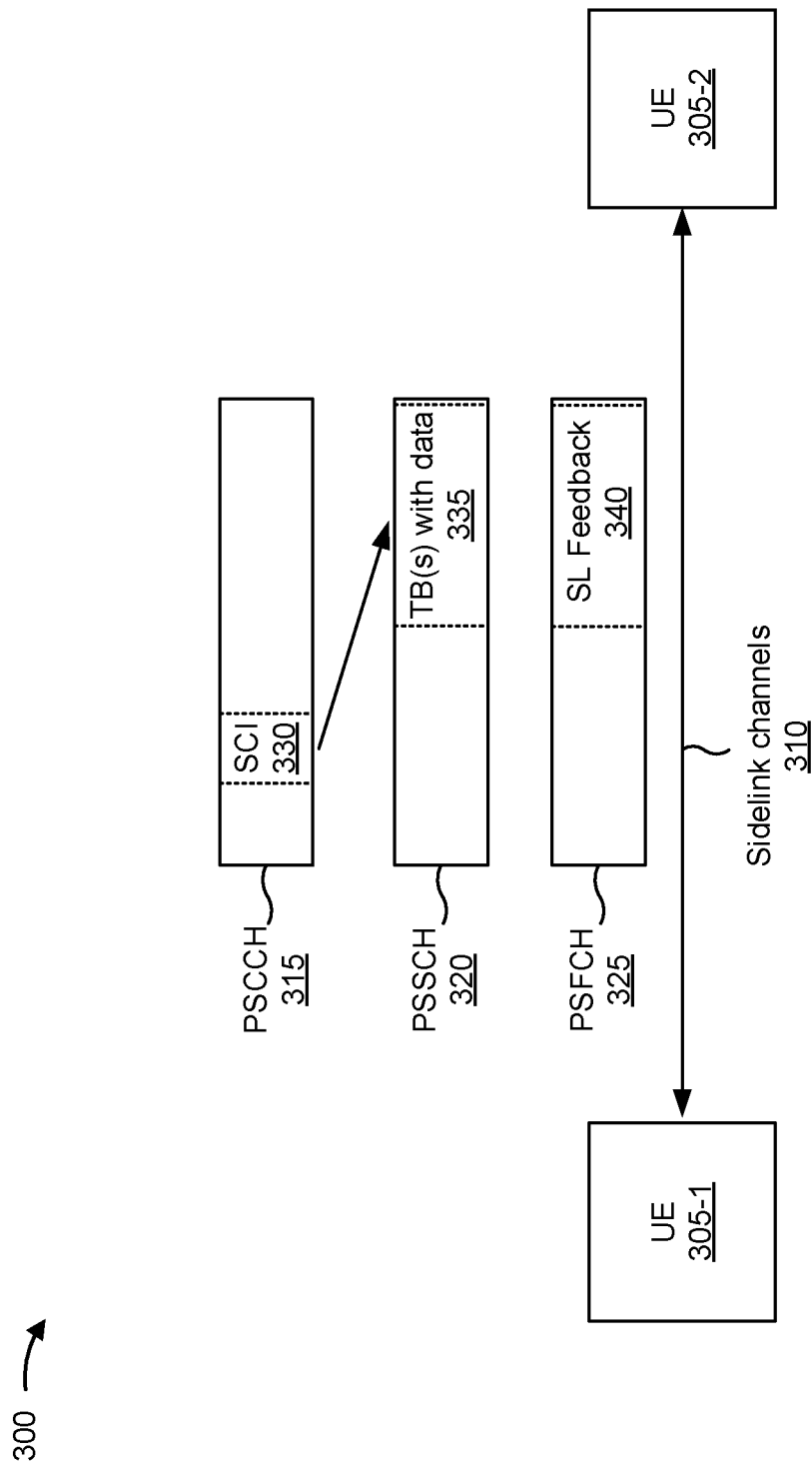
FIG. 3 is a diagram illustrating an aspect of sidelink communications, in accordance with various aspects of the present disclosure.

FIG. 3 is a diagram illustrating an aspect 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. In some aspects, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/ NACK) information), transmit power control (TPC), a scheduling request (SR), and/or the like.

In some aspects, the one or more sidelink channels 310 may use resource pools. In some aspects, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. In some aspects, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, in some aspects, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

PSFCH resources may be from a resource pool. There may be a period for PSFCH transmission in the resource pool. Supported periods may be 0, 1, 2, or 4 slots. PSFCH transmission timing may be the first slot with a PSFCH resource after a PSSCH and after a minimum time gap for PSFCH after the PSSCH. There may be a set of physical resource blocks (PRBs) and a quantity of channel state pairs defined for a PSFCH in a slot. A number of PSSCH slots may correspond to a quantity of PSFCH PRBs.

As indicated above, FIG. 3 is provided as an aspect. Other aspects may differ from what is described with respect to FIG. 3.

Figure 4:
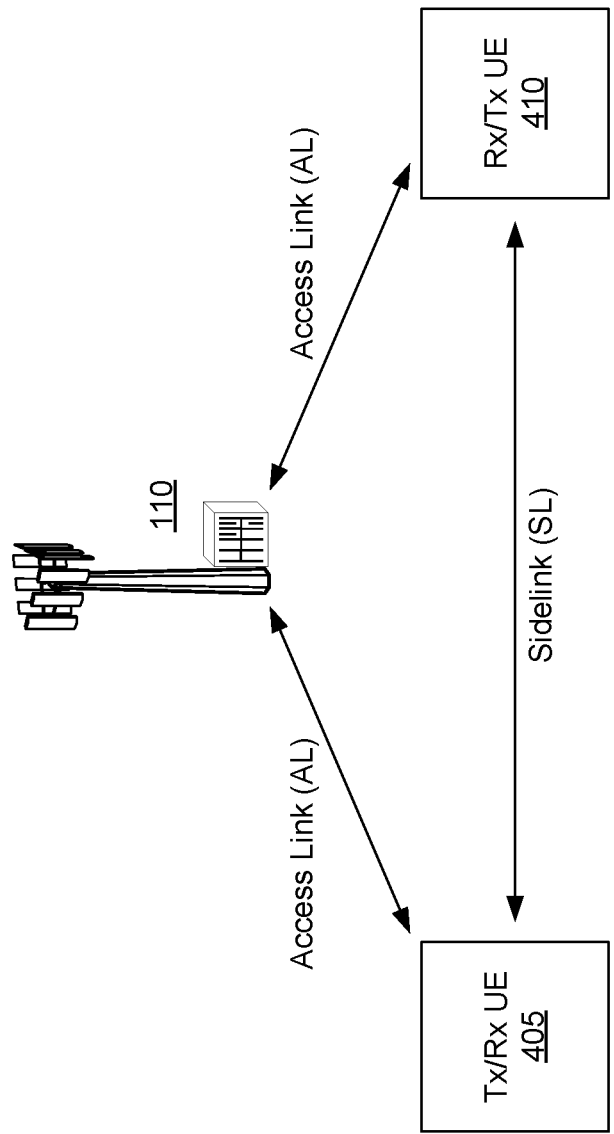
FIG. 4 is a diagram illustrating an aspect of sidelink communications and access link communications, in accordance with various aspects of the present disclosure.

FIG. 4 is a diagram illustrating an aspect 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an aspect. Other aspects may differ from what is described with respect to FIG. 4.

Transmit beamforming for PSCCH and PSSCH may be beneficial for high data rate enhanced mobile broadband traffic and may improve coverage for communications in FR2. A UE may serve as an anchor node, such as a mini gNB with PC5 channels, that schedules communications of a client node (e.g., other UE). Transmit beamforming may be important for anchor node coverage and capacity. Sidelink synchronization signal block (S-SSB) based beam management may be used to assist anchor node to client node transmissions, where SSBs are transmitted on beams in sidelink channels to help with beam selection. However, S-SSB based beam management may not be available if the beam is lost, and may not be available for transmissions from a client node. Consequently, a transmitting node may not know which transmission beam can best serve client nodes. As a result, sidelink communications may suffer and a UE may waste processing and signaling resources recovering from communications that have degraded or failed due to poor beam selection.

According to various aspects described herein, a transmitter node may sweep beams with multiple physical channels at a beginning of a long data burst. In some aspects, a UE may transmit communications on multiple PSCCHs and/or PSSCHs with different beams in different slots. This beam sweeping may use small packets. The UE may receive feedback on a PSFCH for one or more of the beams and select a beam based at least in part on the feedback. The UE may transmit the long data burst in the selected beam. As a result of improved beam selection, communications from the UE may improve, and the UE saves power, processing resources, and signaling resources that would otherwise be consumed by retransmissions of communication that were unsuccessful on a less favorable beam. In some aspects, the UE may transmit a short burst or other communication on the selected beam. In some aspects, the UE may select a beam for reception and receive a communication on the selected beam. In some aspects, the receiving UE may use periodic beam sweeping to track a transmission beam of a transmitting UE.

Figure 5:
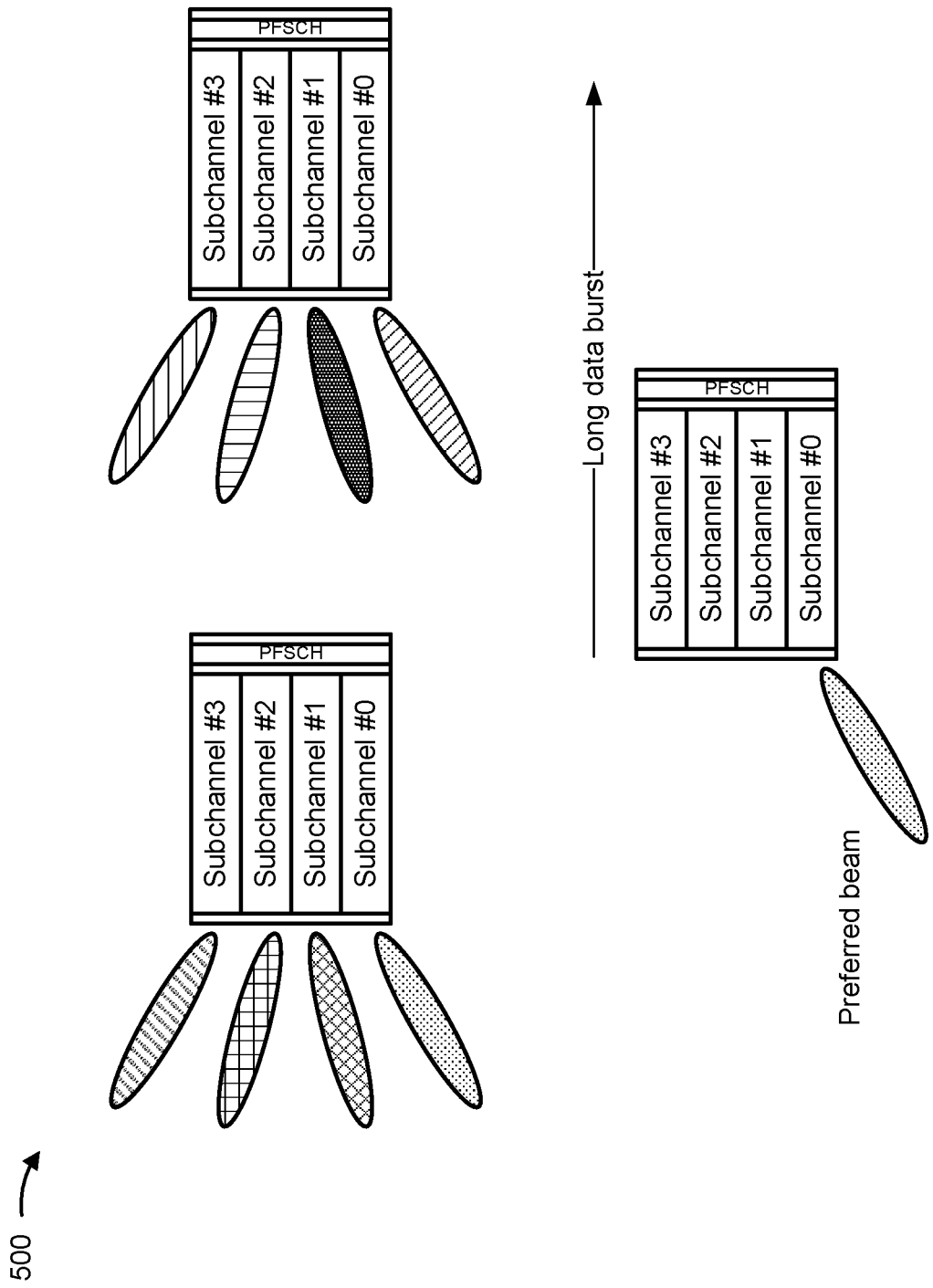
FIG. 5 is a diagram illustrating an aspect of a beam sweep and beam indication on physical sidelink channels, in accordance with various aspects of the present disclosure.

FIG. 5 is a diagram illustrating an aspect 500 of a beam sweep and beam indication on physical sidelink channels, in accordance with various aspects of the present disclosure.

FIG. 5 shows beam sweeping, by a UE, with multiple beams on physical sidelink channels (PSCCH, PSSCH) for each of multiple subchannels. In some aspects, different beams may be transmitted on a same subchannel, represented in aspect 500 of FIG. 5 by different patterns for the different beams. The beam sweeping may take place based at least in part on a determination that a short data burst or a long data burst is to be transmitted. In some aspects, the beam sweeping may take place at a beginning of the long data burst. Feedback for the beams may be received in a PSFCH. The UE may use the feedback to select a preferred beam that is used for the data burst.

In some aspects, beam sweeping may be performed on a PSSCH. The UE may perform beam sweeping in in consecutive resource pools in the time domain at a beginning of a long data burst. This may help to establish an appropriate transmission beam before the UE transmits the long data burst. For FR1, the UE may transmit multiple PSSCHs (and/or multiple PSCCHs) associated with different beams in subchannels within a slot. This may reduce a time of the beam sweeping, which may conserve power, processing resources, and signaling resources.

In some aspects, the beam sweeping may be periodic or semi-periodic. In some aspects, the UE may periodically sweep the beam with PSCCHs, and a periodicity may be similar to an S-SSB burst for beam sweeping, such as 20 milliseconds (ms), 40 ms, 80 ms or 160 ms. The periodicity may be configured via a radio resource control (RRC) message or a medium access control control element (MAC-CE). In some aspects, the beam sweeping may help a receiving UE to keep track of a transmitting UE's transmission beam.

As indicated above, FIG. 5 is provided as an aspect. Other aspects may differ from what is described with respect to FIG. 5.

Figure 6:
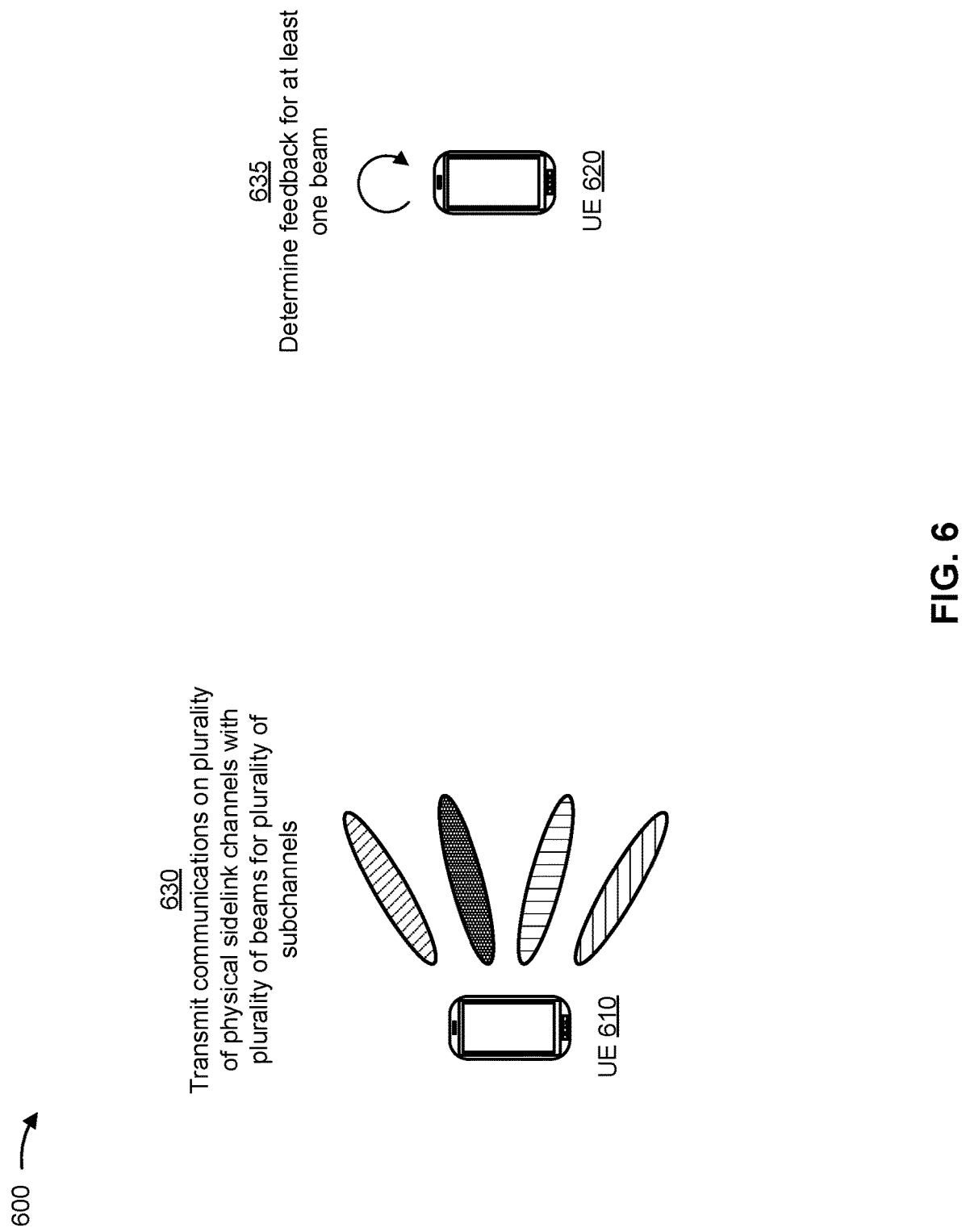
FIG. 6 is a diagram illustrating an aspect of a beam sweep and a beam indication on physical sidelink channels, in accordance with various aspects of the present disclosure.

FIG. 6 is a diagram illustrating aspect 600 of a beam sweep and a beam indication on physical sidelink channels, in accordance with various aspects of the present disclosure. As shown in FIG. 6, aspect 600 includes sidelink communication between a UE 610 (e.g., a UE 120 depicted in FIGS. 1 and 2) and another UE (e.g., a UE 120 depicted in FIGS. 1 and 2). In some aspects, UE 610 may be an anchor node and UE 620 may be a client node.

UE 610 may perform a beam sweep to determine a preferred beam for a data burst (e.g., long data burst on PSSCH). As shown by reference number 630, UE 610 may transmit communications on a plurality of physical sidelink channels (PSCCH and/or PSSCH) with a plurality of beams. The plurality of beams may be in a plurality of subchannels. UE 610 may perform the beam sweep based at least in part on a determination that UE 610 is to transmit the data burst.

In some aspects, the communications may include small packets. A packet may be smaller than a threshold size. In some aspects, a small packet may fill up a smallest resource (e.g., subchannel). Small packets may be scheduled with a low modulation and coding scheme and a rank of 1, as the preferred beam for transmission or reception is yet to be determined. Some small packets with inaccurate transmission beams may need retransmission in a later part of the data burst after a preferred (or correct) transmission beam is determined.

In some aspects, different beams may be mapped into different PSFCH PRB sets. UE 610 may transmit communications with beams on a PSSCH in different subchannels and/or slots. In some aspects, a PSFCH cyclic shift pair resource may be distributed among different source/destination node pairs. UE 610 may map beams to different PRB sets.

As shown by reference number 635, UE 620 may determine feedback for at least one beam. UE 620 may determine measurement results (e.g., signal strength, signal quality). UE 620 may determine any other information that would assist UE 610 with beam selection with respect to communications with UE 620. In some aspects, UE 620 may select a preferred beam.

As indicated above, FIG. 6 is provided as an aspect. Other aspects may differ from what is described with respect to FIG. 6.

Figure 7:
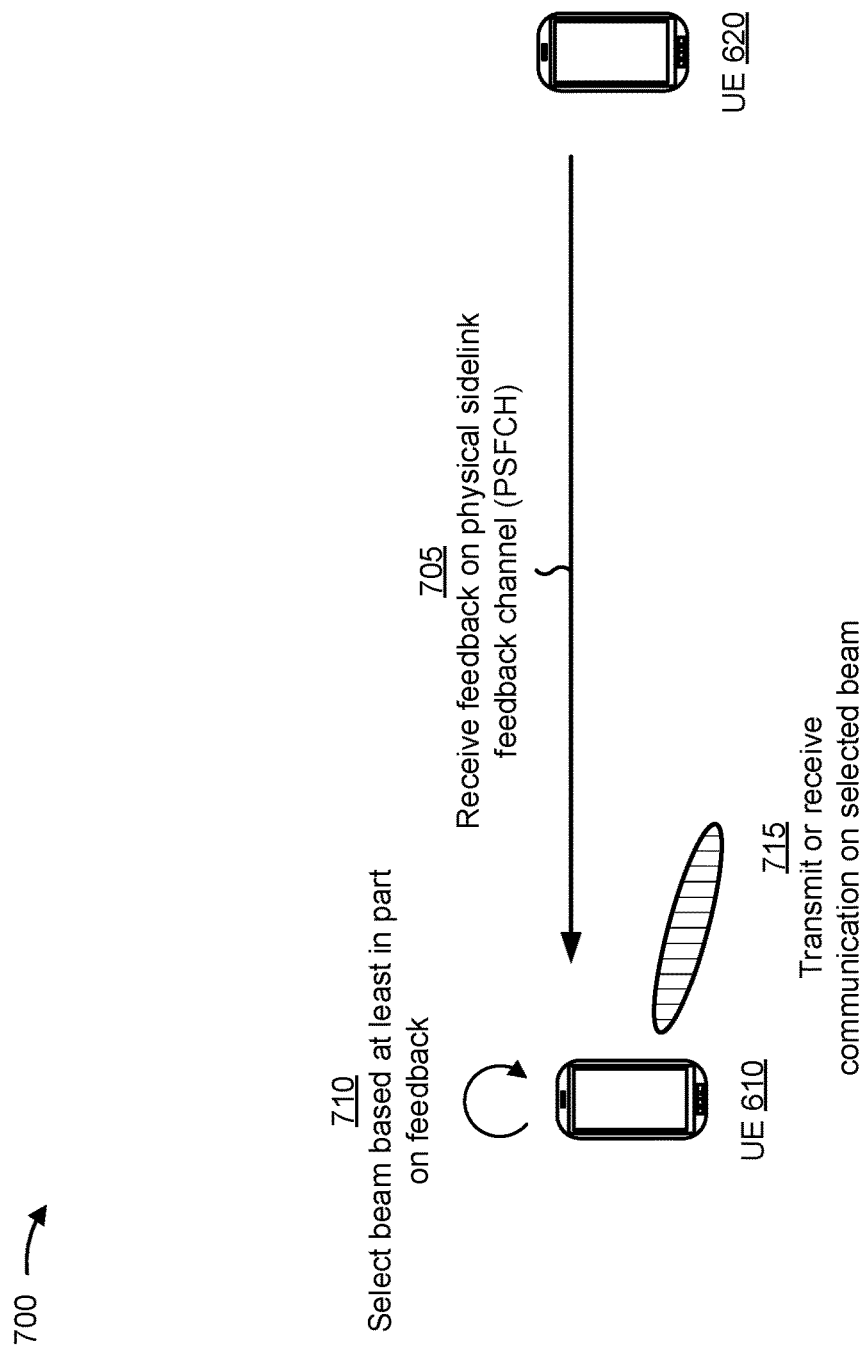
FIG. 7 is a diagram illustrating an aspect of a beam sweep and a beam indication on physical sidelink channels, in accordance with various aspects of the present disclosure.

FIG. 7 is a diagram illustrating aspect 700 of a beam sweep and a beam indication on physical sidelink channels, in accordance with various aspects of the present disclosure. FIG. 7 is a continuation of the operations shown in FIG. 6.

As shown by reference number 705, UE 610 may receive the feedback from UE 620. The feedback may be received on a PSFCH. In some aspects, UE 620 may provide feedback by transmitting acknowledgements on PSFCH resources that are associated with beams formed on a PSSCH. UE 620 may decode multiple communications in beams on a PSSCH (e.g., SCI-2). UE 620 may select strong beams based at least in part on DMRSs of the PSSCH or a PSCCH and provide feedback only on an associated PSFCH. UE 620 may determine an RSRP of multiple beams from DMRSs on the PSCCH and/or the PSSCH.

In some aspects, UE 620 may use PSFCH cyclic shift resource signaling for signaling preferred beams. PSFCH cyclic shift resources (instead of cyclic shift pairs) may be redistributed to a different source/destination identifier (ID) pair. UE 610 may reduce a size of a PRB set per beam.

As shown by reference number 710, UE 610 may select a beam that is a preferred beam based at least in part on the feedback. In some aspects, the feedback may indicate a strong signal or a good signal to noise plus interference ratio for a beam, and UE 610 may select that beam to be the beam.

In some aspects, in FR2, UE 620 may perform a beam management (e.g., P3) procedure to determine a reception beam that corresponds to a selected transmission beam of UE 610. UE 620 may use the reception beam as a transmission beam for providing feedback on the PSFCH. During beam selection as part of an initial access, such as for an initial beam selection procedure (e.g., P1 or P2), UE 620 may use selected beams for signaling preferred beams on the PSFCH. Such beam selection on the PSFCH may need to be signaled before UE 620 determines a corresponding beam to UE 610 (e.g., via P3 procedure). In some aspects, a PSFCH is used to signal a preferred beam in a P2 procedure or using S-SSB beam sweeping in an initial access.

In some aspects, UE 610 may support two antenna panels (2 ports) and may signal a preferred beam on the PSFCH with a different cyclic shift. UE 610 may transmit a beam indication in a pair of cyclic shifts or in different cyclic shifts, and apply different beams on different cyclic shift resources. Instead of redistributing cyclic shifts in a pair to a different source/destination ID pair, UE 620 may assign them to different ports. In some aspects, UE 610 may apply different beams to different PSFCH symbols, even if UE 610 has only one antenna panel. In some aspects, UE 610 may use a combination of the beam indications.

As shown by reference number 715, UE 610 may transmit or receive a communication on the selected beam. For example, UE 610 may transmit a long burst on the selected beam. As a result, the long burst may have a better chance of being successfully received by UE 620, which may conserve power, processing resources, and signaling resources.

In some cases, PSSCH beam sweeping for an individual link may be a waste of resources, as UE 610 may communicate with multiple client UEs. In such a case, common shared PSSCH beam sweeping resources may be preferred. In some aspects, UE 610 may beam sweep for a group of wireless devices, such as client nodes that are UEs. SCI-1 may indicate a group cast in an SCI-2 format field. New SCI-2 formats or fields may be used to activate a client's preferred beam reporting procedure with new PSFCH resource mapping rules. Even for unicast to a particular UE, group cast beaming with small PSSCHs can be applied before the beginning of a long burst. UE 610 may also perform periodic group cast PSCCH beam sweeping.

In group cast type 1, client negative acknowledgements (NACKs) may be provided on a common PSFCH resource. Distance based feedback may be enabled, and UE 610 within a communication range may send a NACK if PSSCH decoding fails. In group cast type 2, each client may provide acknowledgement (ACK) feedback on an associated PSFCH resource. In some aspects, for a group cast beam sweep, each client within a directed group may only report ACKs for a preferred beam on the PSFCH resources. As in group cast type 2, the PSFCH resources hashing may be determined by a destination's ID and a source's ID, and each beamformed PSSCH slot may be associated with PSFCH resources. UE 620 may provide ACKs on the PSFCH and on preferred beams. As there is no need to report a NACK, all the PSFCH cyclic shifts may be used to signal preferred beams for the client group with on or off signaling.

In some aspects, UE 610 may perform a unicast or group cast (e.g., in FR1) to nearby clients. A beam selection resource pool may have a small PRB size to save on overhead. For group cast, UE 610 may select a beam based at least in part on feedback about preferred beams from each of multiple clients. A receiving node that is far away may choose a preferred beam that is different from beams that can serve clients of a higher priority. Receiving nodes that are close to transmission nodes may only need an initial wide beam to serve a communication link.

In some aspects, UE 620 may report a preferred beam on the PSFCH only if a communication range of UE 610 satisfies a minimum communication range (MCR). UE 610 may provide a zone-based location in beam sweeping SCI-2. A communication distance or range may be computed from a transmission zone ID and a location of UE 610. In some aspects, UE 620 may report a preferred beam on the PSFCH only if a communication range of UE 610 satisfies another pre-configured threshold. Transmission nodes, by default, may apply a wide initial beam for a receiving node that does not report a preferred beam. In other words, UE 620 may report a preferred beam, in a group scenario, if a distance warrants reporting the preferred beam. As a result, UE 620 may save signaling resources.

As indicated above, FIG. 7 is provided as an aspect. Other aspects may differ from what is described with respect to FIG. 7.

Figure 8:
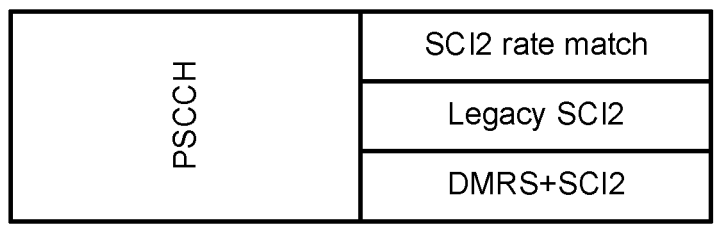
FIG. 8 is a diagram illustrating aspects of a beam sweep on a physical sidelink shared channel, in accordance with various aspects of the present disclosure.
Figure 8:
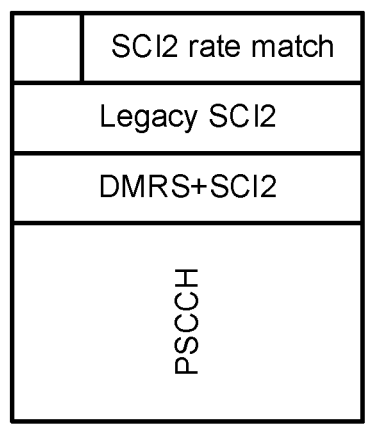

FIG. 8 is a diagram illustrating aspects 800 and 802 of a beam sweep on a PSSCH, in accordance with various aspects of the present disclosure.

In some aspects, the communications on a PSSCH may contain sidelink control information 2 (SCI-2) (e.g., only SCI-2 and no data). PSSCH symbols may be reduced in length, such as to a last symbol containing SCI-2 or to a last symbol of PSSCH. Aspects 800 and 802 show a PSCCH with PSSCH that includes SCI-2.

In some aspects, rate matching of SCI-2 may be used on remaining PSSCH resource elements (REs). As shown in aspects 800 and 802, SCI-2 is shown in REs at an end of a PSSCH that follows a PSCCH or is in parallel with a PSCCH. The UE may reduce a PSSCH decoding timeline and a processing time (K1). If K1 is zero, then a transmission beam confirmation from a receiving node may be included in a slot.

In some aspects, beam selection may be triggered by a new beam selection SCI-2 format for dynamic beam sweeping or by a higher layer configuration for period beam sweeping. A special beam selection SCI-2 format may instruct a receiving node to perform beam selection and report back a preferred beam via PSFCH resources. For periodic or semi-periodic PSSCH-based beam sweeping, a beam selection procedure may be configured at receiving nodes via an RRC message or a MAC-CE.

As indicated above, FIG. 8 provides some aspects. Other aspects may differ from what is described with respect to FIG. 8.

Figure 9:
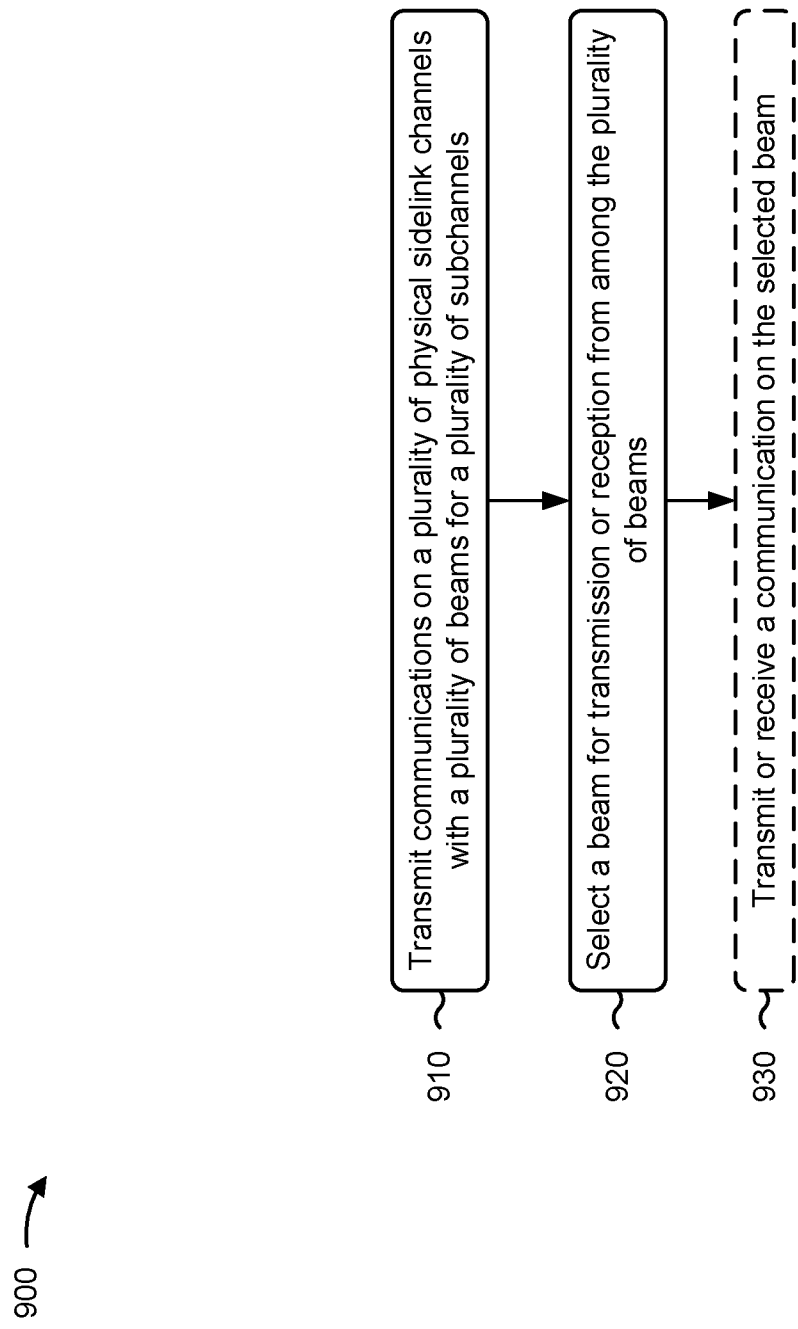
FIG. 9 is a diagram illustrating a process performed by a UE, in accordance with various aspects of the present disclosure.

FIG. 9 is a diagram illustrating a process 900 performed by a UE, in accordance with various aspects of the present disclosure. Process 900 is an aspect where the UE (e.g., a UE 120 depicted in FIGS. 1 and 2, UE 305 depicted in FIG. 3, UE 405 or UE 410 depicted in FIG. 4, UE 610 depicted in FIGS. 6 and 7, and/or the like) performs operations associated with a beam sweep and a beam indication on physical sidelink channels.

As shown in FIG. 9, in some aspects, process 900 may include transmitting communications on a plurality of physical sidelink channels with a plurality of beams for a plurality of subchannels (block 910). In some aspects, the UE (e.g., using receive processor 258, transmit processor 264, controller/processor 280, memory 282, and/or the like) may transmit communications on a plurality of physical sidelink channels with a plurality of beams for a plurality of subchannels, as described above. In some aspects, the UE may transmit communications with a plurality of beams based at least in part on a determination that the UE is to transmit a long burst.

As further shown in FIG. 9, in some aspects, process 900 may include selecting a beam for transmission or reception from among the plurality of beams (block 920). In some aspects, the UE (e.g., using receive processor 258, transmit processor 264, controller/processor 280, memory 282, and/or the like) may select a beam for transmission or reception from among the plurality of beams, as described above.

As further shown in FIG. 9, in some aspects, process 900 may include transmitting or receiving a communication on the selected beam (block 930). In some aspects, the UE (e.g., using receive processor 258, transmit processor 264, controller/processor 280, memory 282, and/or the like) may transmit or receive a communication on the selected beam, as described above. In some aspects, the communication may be a short burst or long burst, and the selected beam may be a transmission beam. The UE may transmit the short burst or long burst on the transmission beam.

Process 900 may include additional aspects, such as any single aspect or any combination of aspects described below and/or in connection with one or more other processes described elsewhere herein.

In a first aspect, at least one of the communications includes a packet that is smaller than a size threshold.

In a second aspect, alone or in combination with the first aspect, the packet fits within a single subchannel of the plurality of subchannels.

In a third aspect, alone or in combination with one or more of the first and second aspects, the packet is scheduled with rank 1.

In a fourth aspect, alone or in combination with one or more of the first through third aspects, process 900 includes retransmitting the packet in a later part of the long burst.

In a fifth aspect, alone or in combination with one or more of the first through fourth aspects, transmitting the communications with the plurality of beams includes transmitting the communications with the plurality of beams in consecutive time resource pools.

In a sixth aspect, alone or in combination with one or more of the first through fifth aspects, transmitting the communications with the plurality of beams includes transmitting the communications with the plurality of beams within a time slot.

In a seventh aspect, alone or in combination with one or more of the first through sixth aspects, transmitting the communications with the plurality of beams includes transmitting the communications on one of physical sidelink control channels or physical sidelink shared channels in one of a periodic beam sweep pattern or a semi-periodic beam sweep pattern.

In an eighth aspect, alone or in combination with one or more of the first through seventh aspects, a configuration for the one of the periodic beam sweep pattern or the semi-periodic beam sweep pattern is received in one of an RRC message or a MAC CE.

In a ninth aspect, alone or in combination with one or more of the first through eighth aspects, process 900 includes reducing a length of a PSSCH symbol, and transmitting the communications with the plurality of beams includes transmitting the communications on the PSSCH symbol with the plurality of beams.

In a tenth aspect, alone or in combination with one or more of the first through ninth aspects, transmitting the communications with the plurality of beams includes transmitting the communications on a PSSCH with SCI-2 and no data.

In an eleventh aspect, alone or in combination with one or more of the first through tenth aspects, process 900 includes transmitting communications with SCI-2 in other resource elements on the PSSCH.

In a twelfth aspect, alone or in combination with one or more of the first through eleventh aspects, transmitting the communications with the plurality of beams includes transmitting the communications with the plurality of beams based at least in part on receiving a sidelink control information 2 (SCI-2) format for dynamic beam sweeping.

In a thirteenth aspect, alone or in combination with one or more of the first through twelfth aspects, process 900 includes receiving feedback on a physical sidelink feedback channel, and the feedback is associated with communications transmitted with the plurality of beams on a physical sidelink shared channel.

In a fourteenth aspect, alone or in combination with one or more of the first through thirteenth aspects, selecting the beam from among the plurality of beams includes selecting the beam based at least in part on respective demodulation reference signals on the plurality of physical sidelink channels.

In a fifteenth aspect, alone or in combination with one or more of the first through fourteenth aspects, process 900 includes receiving feedback for the communications transmitted on the plurality of beams on a plurality of PSFCHs, wherein the plurality of beams is being mapped to different resources of the PSFCHs.

In a sixteenth aspect, alone or in combination with one or more of the first through fifteenth aspects, process 900 includes receiving feedback for the communications transmitted on the plurality of beams via one or more physical sidelink feedback channel cyclic shift resources.

In a seventeenth aspect, alone or in combination with one or more of the first through sixteenth aspects, the UE includes a first antenna panel and a second antenna panel, selecting the beam from among the plurality of beams includes selecting a first beam for the first antenna panel and a second beam for the second antenna panel, and transmitting the communications with the plurality of beams includes transmitting the first beam with a first cyclic shift and the second beam with a second cyclic shift.

In an eighteenth aspect, alone or in combination with one or more of the first through seventeenth aspects, the first beam is indicated on a PSFCH with information associated with the first cyclic shift and the second beam is indicated on the PSFCH with information associated with the second cyclic shift.

In a nineteenth aspect, alone or in combination with one or more of the first through eighteenth aspects, the first beam is associated with a PSFCH symbol and the second beam is associated with a second PSFCH symbol.

In a twentieth aspect, alone or in combination with one or more of the first through nineteenth aspects, selecting the beam from among the plurality of beams includes selecting one or more beams for a group of wireless devices.

In a twenty-first aspect, alone or in combination with one or more of the first through twentieth aspects, selecting the one or more beams for the group of wireless devices includes selecting the one or more beams for the group of wireless devices based at least in part on receiving an indication in sidelink control information for transmitting the communications with the plurality of beams.

In a twenty-second aspect, alone or in combination with one or more of the first through twenty first aspects, the communications include one or more of SCI-2 or group cast packets for transmission on a physical sidelink shared channel to the group of wireless devices.

In a twenty-third aspect, alone or in combination with one or more of the first through twenty second aspects, process 900 includes receiving a preferred beam from at least one wireless device of the group of wireless devices on a physical sidelink feedback channel.

Although FIG. 9 shows blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
FIG. 10 is a diagram illustrating a process performed by a UE, in accordance with various aspects of the present disclosure.

FIG. 10 is a diagram illustrating a process 1000 performed by a UE, in accordance with various aspects of the present disclosure. Process 1000 is an aspect where the UE (e.g., a UE 120 depicted in FIGS. 1 and 2, UE 305 depicted in FIG. 3, UE 405 or UE 410 depicted in FIG. 4, UE 620 depicted in FIGS. 6 and 7, and/or the like) performs operations associated with a beam sweep and a beam indication on physical sidelink channels.

As shown in FIG. 10, in some aspects, process 1000 may include receiving, from another UE, at least one communication on at least one physical sidelink channel on at least one beam (block 1010). In some aspects, the UE (e.g., using receive processor 258, transmit processor 264, controller/processor 280, memory 282, and/or the like) may receive, from another UE, at least one communication on at least one physical sidelink channel on at least one beam, as described above.

As further shown in FIG. 10, in some aspects, process 1000 may include determining feedback for the at least one beam (block 1020). In some aspects, the UE (e.g., using receive processor 258, transmit processor 264, controller/processor 280, memory 282, and/or the like) may determine feedback for the at least one beam, as described above.

As further shown in FIG. 10, in some aspects, process 1000 may include transmitting the feedback to the other UE on a PSFCH (block 1030). In some aspects, the UE (e.g., using receive processor 258, transmit processor 264, controller/processor 280, memory 282, and/or the like) may transmit the feedback to the other UE on a PSFCH, as described above.

Process 1000 may include additional aspects, such as any single aspect or any combination of aspects described below and/or in connection with one or more other processes described elsewhere herein.

In a first aspect, process 1000 includes transmitting or receiving a communication, such as a short burst or long burst, on a beam based at least in part on transmitting the feedback.

In a second aspect, alone or in combination with the first aspect, the at least one communication includes a packet that is smaller than a size threshold.

In a third aspect, alone or in combination with one or more of the first and second aspects, the packet fits within one subchannel.

In a fourth aspect, alone or in combination with one or more of the first through third aspects, the packet is scheduled with rank 1.

In a fifth aspect, alone or in combination with one or more of the first through fourth aspects, the at least one communication includes SCI-2 and no data on a PSSCH.

In a sixth aspect, alone or in combination with one or more of the first through fifth aspects, process 1000 includes receiving at least one communication with SCI-2 in other resource elements on the PSSCH.

In a seventh aspect, alone or in combination with one or more of the first through sixth aspects, transmitting the feedback includes transmitting the feedback via one or more PSFCH cyclic shift resource.

In an eighth aspect, alone or in combination with one or more of the first through seventh aspects, transmitting the feedback includes determining a preferred beam from among the at least one beam, and transmitting an indication of the preferred beam in the feedback to the other UE based at least in part on a determination that a range associated with the other UE satisfies a range threshold.

In a ninth aspect, alone or in combination with one or more of the first through eighth aspects, the range threshold includes a minimum communication range.

Although FIG. 10 shows blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting communications on a plurality of physical sidelink channels with a plurality of beams for a plurality of subchannels;
   selecting a beam for transmission or reception from among the plurality of beams;
   reduce a length of a physical sidelink shared channel (PSSCH) symbol; and
   when transmitting the communications with the plurality of beams, transmitting the communications on the PSSCH symbol with the plurality of beams.

2. The method of claim 1, further comprising receiving feedback on a physical sidelink feedback channel, wherein the feedback is associated with communications transmitted with the plurality of beams on a physical sidelink shared channel.

3. The method of claim 1, wherein selecting the beam from among the plurality of beams includes selecting the beam based at least in part on respective demodulation reference signals on the plurality of physical sidelink channels.

4. The method of claim 1, further comprising receiving feedback for the communications transmitted on the plurality of beams on a plurality of physical sidelink feedback channels (PSFCHs), wherein the plurality of beams are mapped to different resources of the PSFCHs.

5. The method of claim 1, further comprising receiving feedback for the communications transmitted on the plurality of beams via one or more physical sidelink feedback channel cyclic shift resources.

6. A user equipment (UE) for wireless communication, comprising:
   a memory; and
   one or more processors operatively coupled to the memory, the one or more processors configured to:
   transmit communications on a plurality of physical sidelink channels with a plurality of beams for a plurality of subchannels;
   select a beam for transmission or reception from among the plurality of beams;
   reduce a length of a physical sidelink shared channel (PSSCH) symbol; and
   when transmitting the communications with the plurality of beams, transmit the communications on the PSSCH symbol with the plurality of beams.

7. The UE of claim 6, wherein transmitting the communications with the plurality of beams includes transmitting the communications with the plurality of beams based at least in part on a determination that the UE is to transmit a long burst.

8. The UE of claim 6, wherein at least one of the communications includes a packet that is smaller than a size threshold.

9. The UE of claim 8, wherein the packet fits within a single subchannel of the plurality of subchannels.

10. The UE of claim 6, wherein the one or more processors, when transmitting the communications with the plurality of beams, are configured to transmit the communications with the plurality of beams in consecutive time resource pools.

11. The UE of claim 6, wherein the one or more processors, when transmitting the communications with the plurality of beams, are configured to transmit the communications on one of physical sidelink control channels or physical sidelink shared channels in one of a periodic beam sweep pattern or a semi-periodic beam sweep pattern.

12. The UE of claim 6, wherein the one or more processors, when transmitting the communications with the plurality of beams, are configured to transmit the communications on a physical sidelink shared channel (PSSCH) with sidelink control information 2 (SCI-2) and no data.

13. The UE of claim 12, wherein the one or more processors are further configured to transmit communications with sidelink control information 2 (SCI-2) in other resource elements on the PSSCH.

14. The UE of claim 6, wherein the one or more processors, when transmitting the communications with the plurality of beams, are configured to transmit the communications with the plurality of beams based at least in part on receiving a sidelink control information 2 (SCI-2) format for dynamic beam sweeping.

15. The UE of claim 6, wherein the one or more processors are further configured to receive feedback on a physical sidelink feedback channel, wherein the feedback is associated with communications transmitted with the plurality of beams on a physical sidelink shared channel.

16. The UE of claim 6, wherein the one or more processors, when selecting the beam from among the plurality of beams, are configured to select the beam based at least in part on respective demodulation reference signals on the plurality of physical sidelink channels.

17. The UE of claim 6, wherein the one or more processors are further configured to receive feedback for the communications transmitted on the plurality of beams on a plurality of physical sidelink feedback channels (PSFCHs), wherein the plurality of beams are mapped to different ones of the PSFCHs.

18. The UE of claim 6, wherein the one or more processors are further configured to receive feedback for the communications transmitted on the plurality of beams via one or more physical sidelink feedback channel cyclic shift resources.

19. The UE of claim 6, wherein the UE includes a first antenna panel and a second antenna panel, wherein selecting the beam from among the plurality of beams includes selecting a first beam for the first antenna panel and a second beam for the second antenna panel, and wherein the one or more processors are further configured to transmit the first beam with a first cyclic shift and the second beam with a second cyclic shift.

20. The UE of claim 19, wherein the first beam is indicated on a physical sidelink feedback channel (PSFCH) with information associated with the first cyclic shift and the second beam is indicated on the PSFCH with information associated with the second cyclic shift.

21. The UE of claim 19, wherein the first beam is associated with a first physical sidelink feedback channel (PSFCH) symbol and the second beam is associated with a second PSFCH symbol.

* * * * *